United States Patent [19]
Koguchi

[11] Patent Number: 5,949,526
[45] Date of Patent: Sep. 7, 1999

[54] EXPOSING APPARATUS

[75] Inventor: Hideyuki Koguchi, Kanagawa, Japan

[73] Assignee: Fuji Photo Film Co., Ltd., Kanagawa, Japan

[21] Appl. No.: 08/908,174

[22] Filed: Aug. 7, 1997

[30] Foreign Application Priority Data

Aug. 7, 1996 [JP] Japan ................................ 8-208202

[51] Int. Cl.⁶ .......................... G03B 27/58; G03B 27/52
[52] U.S. Cl. ............................................. 355/47; 355/41
[58] Field of Search ............................... 355/40, 41, 43, 355/47; 359/10, 11; 349/2, 4

[56] References Cited

U.S. PATENT DOCUMENTS

| | | | |
|---|---|---|---|
| 4,435,732 | 3/1984 | Hyatt | 358/254 |
| 5,116,527 | 5/1992 | Coates et al. | 252/299.61 |
| 5,212,555 | 5/1993 | Stoltz | 358/206 |
| 5,258,869 | 11/1993 | Nochebuena | 359/378 |
| 5,262,879 | 11/1993 | Davis | 359/10 |
| 5,327,263 | 7/1994 | Katagiri et al. | 358/471 |
| 5,386,313 | 1/1995 | Szegedi et al. | 359/280 |
| 5,414,490 | 5/1995 | Kurokawa et al. | 355/71 |
| 5,416,561 | 5/1995 | Sawano et al. | 355/43 |
| 5,521,748 | 5/1996 | Sarraf | 359/321 |
| 5,793,504 | 8/1998 | Stoll | 359/11 |

FOREIGN PATENT DOCUMENTS 0 479 157 A2  4/1992  European Pat. Off. .
33 29 311 A1  2/1985  Germany .

OTHER PUBLICATIONS

"High–Speed Analog Spatial Light Modulator Using a Hydrogenated Amorphous Silicon Photosensor and an Electroclinic Liquid Crystal"; Moddel et al., Appl. Phys. Lett. 55(16), Oct. 16, 1989; American Institute of Physics, pp. 1603–1605.

Patents Abstracts of Japan, publication No. 09246638, publication date Sep. 19, 1997 (abstract).

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

The improved apparatus for exposing a light-sensitive material to recording light modulated in accordance with an image to be recorded includes a source of recording light, a multi-channel spatial light modulating element using a liquid crystal, imaging optics with which the recording light modulated with the spatial light modulating element is imaged on the light-sensitive material, and apparatus for adjusting the temperature of the spatial light modulating element. This exposing apparatus ensures that image of high quality (high resolution) can be recorded at high speed by performing multi-channel exposure with an inexpensive and simple device design.

17 Claims, 7 Drawing Sheets

EXPOSING APPARATUS

BACKGROUND OF THE INVENTION

This invention relates to the art of an exposing apparatus which exposes a light-sensitive material to perform image recording. More particularly, the invention relates to a multi-channel exposing apparatus capable of rapid recording of high-quality images using a liquid-crystal based spatial light modulating element.

Exposing apparatuses which scan and expose light-sensitive materials such as silver halide photographic materials and electrophotographic photoreceptors by means of recording light modulated in accordance with the image to be recorded, are commonly employed in various types of printers and copiers.

Most of the exposing apparatuses used today depend on light beam scanning for exposure, in which an optical beam modulated in accordance with the image to be recorded is deflected in a main scanning direction as the beam and the light-sensitive material are moved relative to each other in an auxiliary scanning direction perpendicular to the main scanning direction, whereby the light-sensitive material is scan exposed two-dimensionally to record an image (either latent or visible).

With the recent advances in image recording technology, it has become possible to record high-quality images at high speed by means of exposing apparatuses of such optical beam scanning type. However, imagewise exposure by means of optical beam scanning is limited in exposing speed and resolution and, particularly with large images, it is even more difficult to record high-quality images at high speed for the following reasons.

In imagewise exposure by optical beam scanning, a light beam modulated in accordance with the image to be recorded is deflected for scanning with an optical deflector such as a polygonal mirror or a galvanometric mirror. However, such optical beam scanning is theoretically limited in the resolution that can be attained and due to limiting factors such as the modulation (response) speed of the modulating element and the scanning precision of the optical deflector, it is impossible to achieve image recording with resolution higher than a certain value.

In order to provide higher resolution, the scanning speed has to be slowed down in conformity with the modulation speed of the optical modulator and this increases the image recording time. On the other hand, in order to realize high-speed recording, the resolution has to be lowered in conformity with the modulation speed.

The recording speed is also limited by the fact that exposure basically employs a single beam (in color image recording, one beam is used for each of R, G, and B exposing light).

As a further problem, the angle of deflection, or scan width, is limited, so in order to record large images, say, one of size A2, the pathlength of the optical beam has to be increased significantly, but then the exposing apparatus will unavoidably become bulky, causing considerable difficulty in recording larger images.

In addition, the optical beam scanning apparatus is costly since it requires expensive optics including an optical deflector, tilting compensation optics and an fθ lens. Particularly in the case where high-speed recording or the recording of larger images is desired, expensive optical elements of high precision or those of large size are required and a further increase in cost is unavoidable.

SUMMARY OF THE INVENTION

An object, therefore, of the present invention is to provide a novel exposing apparatus that is inexpensive and simple in construction and which yet is capable of rapid recording of high-quality images at high resolution (high pixel density).

This object of the invention can be attained by an apparatus which exposes a light-sensitive material to recording light modulated in accordance with an image to be recorded, comprising a source of the recording light, a multi-channel spatial light modulating element using a liquid crystal as modulating means, imaging optics with which the recording light modulated with said spatial light modulating element is imaged on said light-sensitive material, and means for adjusting the temperature of said spatial light modulating element.

In a preferred embodiment of the exposing apparatus, the liquid crystal is a smectic A liquid crystal.

In another preferred embodiment, the temperature adjusting means adjusts the temperature of the spatial light modulating element on the basis of detection of the temperature of the spatial light modulating element or the amount of light modulated by the same.

The stated object of the invention can also be attained by an apparatus which exposes a light-sensitive material to recording light modulated in accordance with image data supplied from a source of image data, characterized by comprising a source of the recording light, a multi-channel spatial light modulating element using a liquid crystal as modulating means, imaging optics with which the recording light modulated with said spatial light modulating element is imaged on said light-sensitive material, a sensor for measuring the amount of light modulated with said spatial light modulating element, and means for correcting said image data in accordance with the amount of light detected by said sensor.

In a preferred embodiment of this exposing apparatus, the liquid crystal is a smectic A liquid crystal.

DETAILED DESCRIPTION OF THE INVENTION

The exposing apparatus of the invention will now be described in detail with reference to the preferred embodiments shown in the accompanying drawings.

Figure 1:
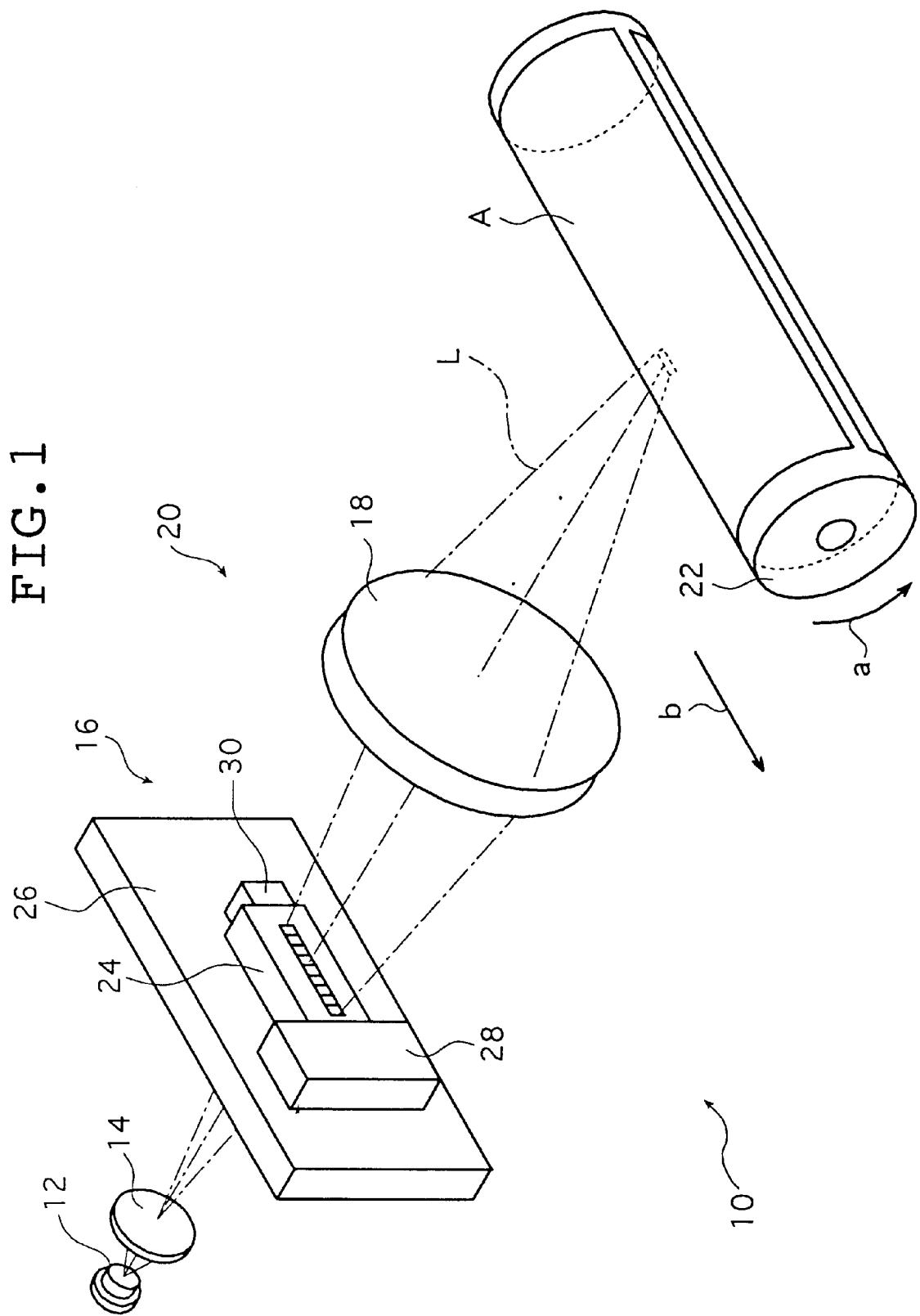
FIG. 1 is a perspective view showing schematically an embodiment of the exposing apparatus of the invention.

FIG. 1 is a perspective view showing schematically an embodiment of the exposing apparatus of the invention. The exposing apparatus generally indicated by 10 in FIG. 1 is basically composed of an optical unit 20 and cylindrical exposing drum 22. The optical unit 20 comprises a light source 12 from which recording light L issues, shaping optics 14, an optical modulator 16, imaging optics 18, etc. which are contained in a housing (not shown) to provide an integral assembly.

A light-sensitive material A held in contact with the lateral side of the exposing drum 22 is illuminated with the precording light L modulated with the optical modulator 16 as the drum 22 rotates in the direction of arrow a about the longitudinal axis while, at the same time, the optical unit 20 is moved parallel to the rotating axis of the drum 22 in the direction of arrow b perpendicular to the rotation of the drum 22, whereby the light-sensitive material A is scanned with the recording light L two-dimensionally to be exposed imagewise.

The exposing apparatus 10 may be so adapted that the exposing drum 22 rather than the optical unit 20 is moved in the direction of arrow b.

Depending on the spectral sensitivity characteristics of the light-sensitive material A, various known types of light sources that issue recording light L of a narrow wavelength range capable of exposing the light-sensitive material A may be employed as the light source 12; thus, depending on the light-sensitive material A, various known types of semiconductor lasers (LD), LED and gas laser may be employed.

In the exposing apparatus 10 of the invention, the optical modulator 16 to be described below in detail, either blocks or transmits the recording light L in accordance with the image to be recorded, thereby performing pulse-width modulation; hence, the light source 12 keeps issuing the recording light L throughout the process of image recording (or as long as the exposing apparatus operates).

The shaping optics 14 enlarges the recording light L from the source 12 to a sufficient size that can illuminate all the area of the optical modulator 16 (or spatial light modulating element 24) through which the recording light L is to pass.

As long as this requirement can be met, various known types of optical elements such as lenses, mirrors or combinations thereof may be employed as the shaping optics 14. Needless to say, the shaping optics 14 is preferably selected, designed and positioned in such a way that the recording light L is not enlarged to reach an unwanted area, particularly one that adversely affects the light-sensitive material A.

If the exposing apparatus 10 of the invention has the light source 12 provided in such a position that the emitted recording light L, when it is launched into the optical modulator 16, is capable of illuminating all the area through which it is to pass, the shaping optics 14 may be omitted.

The optical modulator 16, which is the most characterizing portion of the exposing apparatus 10 of the invention, modulates the recording light L by means of a spatial light modulating element 24 utilizing a liquid crystal. The optical modulator 16 comprises a base 26 for holding the spatial light modulating element 24, as well as a heating module 28 and a temperature sensor 30 both of which are held on the base 26 together with the spatial light modulating element 24.

The recording light L shaped by the shaping optics 14 passes through the optical modulator 16 to be subjected to pulse-width modulation in accordance with the image to be recorded, whereby it is allowed to carry the image.

The base 26 is a member for holding and fixing the spatial light modulating element 24, heating module 28 and temperature sensor 30 in predetermined positions. In a preferred embodiment, the base 26 also serves as temperature retaining means (heat accumulator) for adjusting the temperature of the spatial light modulating element 24. Having these capabilities, the base 26 is typically made as a sheet of a metal of high thermal conductivity such as aluminum.

The spatial light modulating element 24 utilizing a liquid crystal, in particular, a smectic A liquid crystal has temperature dependency in response speed, modulation characteristics and light transmittance. If the base 26 is adapted to have the added capability of serving as a heat accumulator, the temperature adjustment by means of heating module 28 and temperature sensor 30 can be accomplished in a more effective and exact way. This point will be discussed below in greater detail.

The base 26 has an opening through which the recording light L can pass and which is bored in a position in registry with the area where the spatial light modulating element 24 is fixed.

In the illustrated exposing apparatus 10 which performs pulse-width modulation, the spatial light modulating element 24 is of a type that uses an optical shutter depending on a liquid crystal for operation. Briefly, the spatial light modulating element 24 is a multi-channel liquid-crystal shutter array composed of liquid-crystal optical shutters arranged parallel to the rotating axis of the exposing drum 22.

Figure 2:
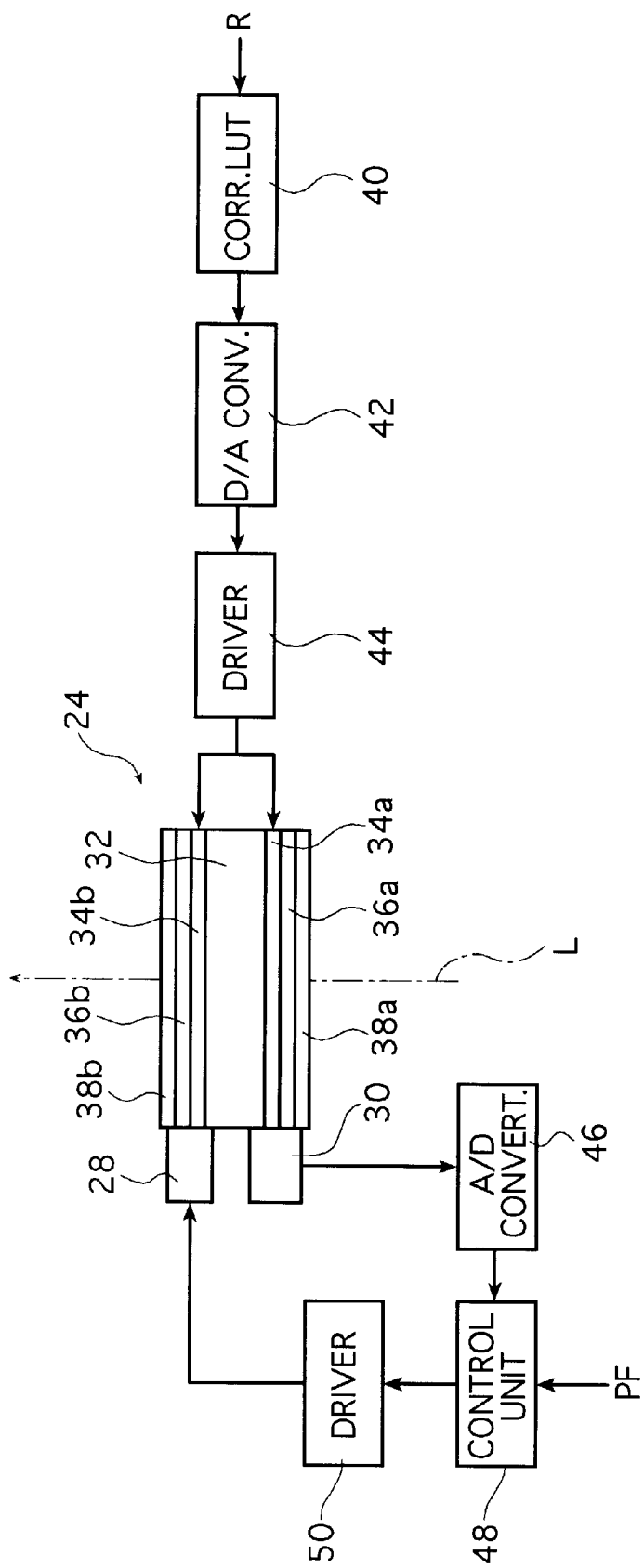
FIG. 2 shows the concept of a spatial light modulating element in the exposing apparatus shown in FIG. 1, as well as a block diagram of the drive and temperature control circuits for the modulating element.

FIG. 2 shows conceptually an exemplary construction of the spatial light modulating element 24, as well as a block diagram of the associated drive and temperature control circuits.

As shown, the spatial light modulating element 24 has a liquid crystal cell comprising a liquid crystal layer 32 held between two transparent electrodes 34a and 34b; the liquid crystal cell in turn is held between a polarizer 36a in contact with the transparent electrode 34a on the entrance side and a analyzer 36b in contact with the transparent electrode 34b on the exit side. The assembly of those components is held between two glass sheets 38a and 38b to construct the spatial light modulating element 24. The light that can pass through the polarizer 36a and the light that can pass through the analyzer 36b differ in the angle of polarization by, for example, 90 degrees.

The transparent electrodes 34a and 34b, as well as the polarizer 36a and the analyzer 36b are not limited to any particular types and may be selected from various known types which are utilized in liquid-crystal displays, shutters, etc.

Figure 3:
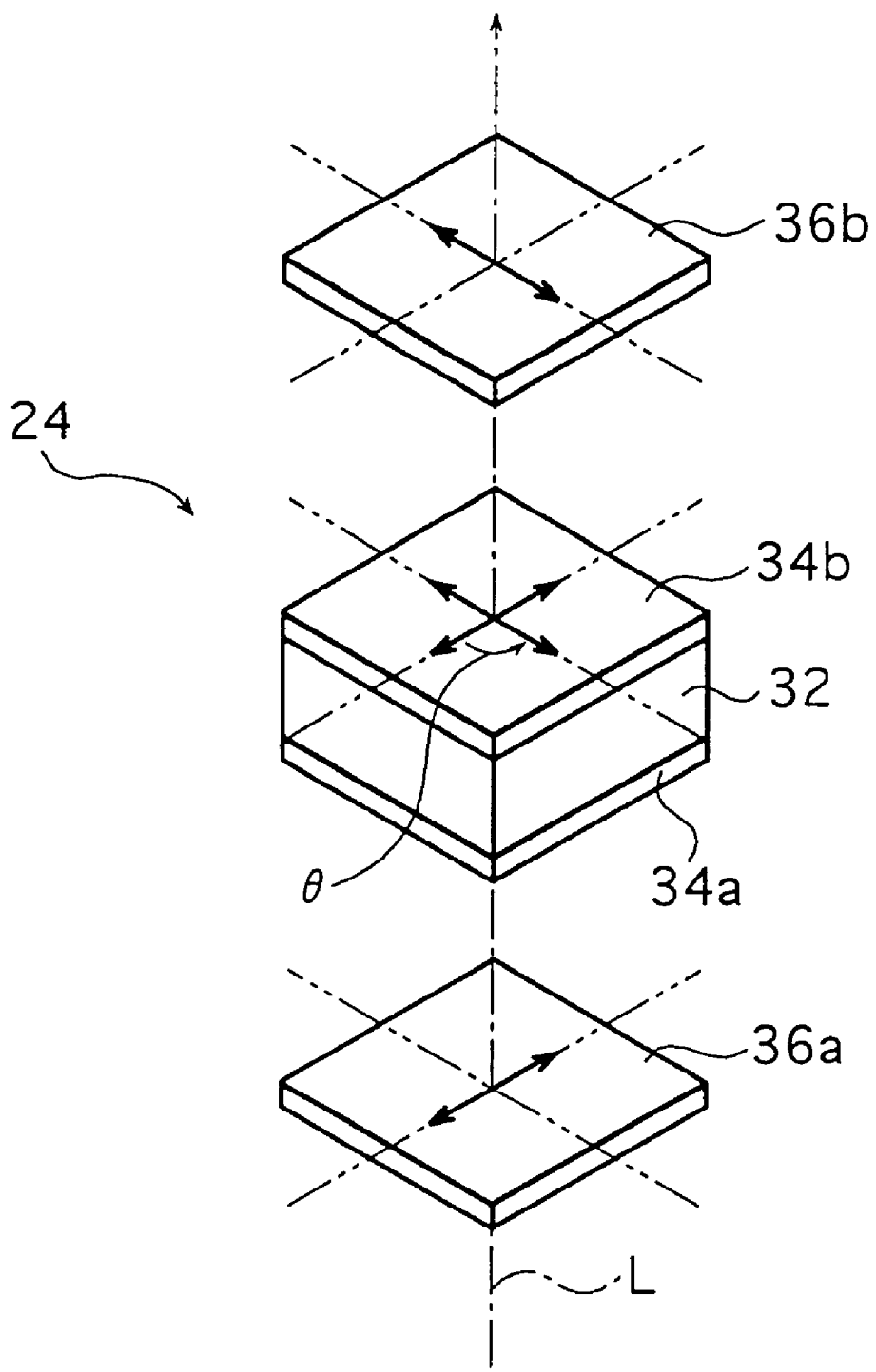
FIG. 3 is a conceptual diagram illustrating the operation of the spatial light modulating element shown in FIG. 2.

FIG. 3 shows conceptually the operation of the spatial light modulating element 24. As noted above, the light that can pass through the polarizer 36a and the light that can pass through the analyzer 36b differ by 90 degrees in the angle of polarization. Therefore, in the absence of voltage applied to the liquid crystal layer 32 through the transparent electrodes 34A and 34b, the linearly polarized recording light L from the polarizer 36a will simply pass through the liquid-crystal layer 32 and is hence blocked by the analyzer 36b.

If a voltage is applied to the liquid-crystal layer 32 through the transparent electrodes 34a and 34b, the direction of the liquid-crystal orientation changes and the direction of polarization of the light passing through the liquid-crystal layer 32 will vary by angle $\theta$ as shown in FIG. 3. In other words, by supplying the liquid-crystal layer 32 with a voltage high enough to rotate the plane of polarization of the recording light L by 90 degrees, the recording light L is allowed to pass through the analyzer 36b (hence, the spatial light modulating element 24).

Therefore, by applying a specified voltage to the liquid-crystal layer 32 through the transparent electrodes 34a and 34b in accordance with the image to be recorded, the recording light L is either blocked or transmitted in accordance with the image to be recorded, thereby achieving pulse-width modulation.

The spatial light modulating element 24 has transparent electrodes 34a and 34b formed in more than one pair, 64 pairs in the illustrated case, with respect to the liquid-crystal layer 32 along the rotating axis of the exposing drum 22, and the individual electrode pairs are adapted to be controllable independently of one another. Thus, the spatial light modulating element 24 is a 64-channel liquid-crystal shutter array composed of 64 independent liquid-crystal shutters.

The incident recording light L passes through the spatial light modulating element 24 to produce independently modulated beams $L_1$–$L_{64}$.

Thus, using the 64-channel spatial light modulating element 24, the illustrated exposing apparatus 10 is capable of forming 64 scanning lines simultaneously from 64 beams of the recording light L for exposing the light-sensitive material A. If one channel corresponds to the image recording of one pixel, the exposing apparatus 10 permits simultaneous image recording of 64 pixels to thereby achieve very fast image recording. In terms of the recording speed, this may be compared to an optical beam scanner which performs imagewise exposure with 64 optical beams.

By adjusting the refractive power and other parameters of the imaging optics 18 which allows the recording light L passing through the spatial light modulating element 24 to be imaged on the light-sensitive material A, the shape of the spot of imaged recording light L and the distance channels can be set at a desired value to provide ease in improving the resolution (recording density).

Therefore, according to the exposing apparatus 10 of the invention, high-quality (high-resolution) images can be produced at high speed by means of multi-channel exposure. Since the number of channels, or the number of liquid-crystal shutters in the spatial light modulating element 24, can be easily set at any desired value, the need for even faster image recording can be met without lowering the resolution.

Further in addition, the exposing apparatus 10 does not depend on an optical deflector for imagewise exposure as in the conventional method of performing exposure by scanning with a deflected optical beam; therefore, by selecting a suitable size for the exposing drum 22, the need for recording large images such as one of size Al can be easily met.

Various types of liquid crystals can be employed in the spatial light modulating element 24 of the exposing apparatus 10 as long as the speed of change in the direction of liquid-crystal orientation in response to voltage application is fast enough to achieve the desired recording speed.

Specifically, smectic liquid crystals, in particular, smectic A liquid crystals (which are used as smectic A phases), are preferably used, with ferroelectric liquid crystals (FLC) being particularly preferred.

Ferroelectric liquid crystals have high response speeds and are generally known to experience a phase transition from smectic C* to smectic A as the temperature rises. Compared to nematic liquid crystals and others that are commonly used in liquid-crystal displays, ferroelectric smectic C* liquid crystals are significantly high in response speed; however, ferroelectric smectic A liquid crystals provide even faster response speeds and, hence, are more suitable for use in the present invention which intends to accomplish high-speed recording.

In addition, ferroelectric liquid crystals, in particular, ferroelectric smectic A liquid crystals have high linearity in such aspects as the change in the angle through which the plane of polarization rotates in response to voltage application and, hence, the spatial light modulating element 24 can be controlled with ease.

Figure 4:
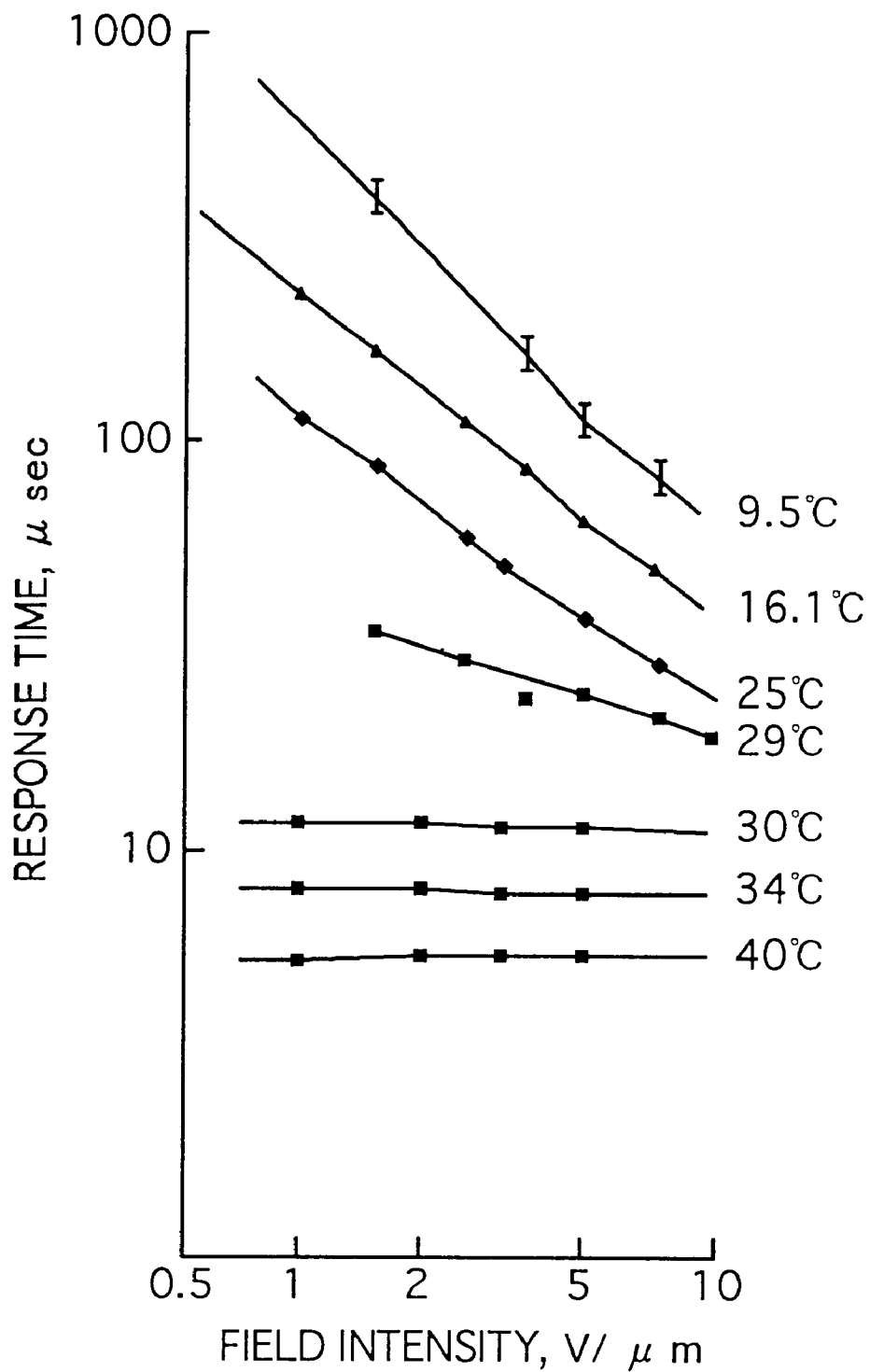
FIG. 4 is a graph showing the relationship between the voltage applied across a ferroelectric smectic A liquid crystal and its response speed.

FIG. 4 is a graph showing the relationship between the applied voltage (field intensity) and the speed of change in the direction of liquid-crystal orientation (response time) of M764E (the ferroelectric liquid crystal reported in Abdulhalin et al., Appl. Phys. Lett. 55(16), Oct. 16, 1989), with the liquid-crystal temperature being taken as parameter.

M764E has a phase transition point at 29° C., beyond which it is a smectic A phase and below which it turns to a smectic C* phase.

As is clear from FIG. 4, even the smectic C* phase has a better response characteristic than nematic liquid crystals and the like; however, the smectic A phase (smectic A liquid crystal) provides a faster response speed almost 100 times as much. In addition, the voltage-dependent variation in the response speed of the smectic A phase is extremely small and, hence, stable device operation can be realized.

Various known types of ferroelectric liquid crystals may be employed in the present invention.

Specific examples include M764E (see above), a liquid crystal represented by the formula (A) set forth below, the liquid crystal (A) blended with a liquid crystal represented by the formula (B) set forth below, and DOBAMBC represented by the formula (C) also set forth below:

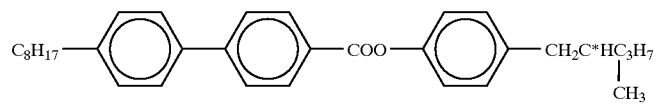

[A]

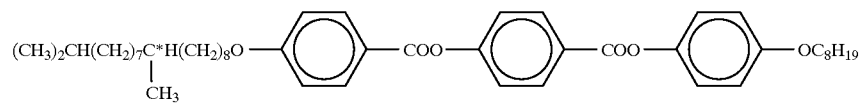

[B]

-continued

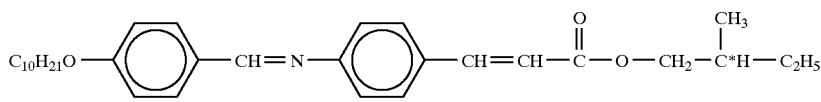

[C]

Also useful with advantages are the ferroelectric liquid crystals described in U.S. Pat. No. 5,116,527.

The number of channels in the spatial light modulating element 24 of the exposing apparatus 10 is not limited to any particular value and may be determined as appropriate for such factors as the performance required for the exposing apparatus 10; in order to ensure that high-resolution images are recorded at high speed, 16–256 channels are preferred, with 32–128 channels being even more preferable.

The foregoing description concerns the case of performing pulse-width modulation with the spatial light modulating element 24 but it may be operated to perform pulse-number modulation with equal advantages. Since the liquid crystal used in the spatial light modulating element 24 is voltage-dependent in the angle through which the plane of polarization rotates, this effect may be utilized in such a way that the angle of rotation is varied in accordance with the image to be recorded, thereby adjusting the amount of recording light L passing through the analyzer 36b so as to achieve imagewise exposure by intensity modulation. It should, however, be mentioned that with the spatial light modulating element 24 using ferroelectric smectic A liquid crystal, the amount of the recording light L is fairly difficult to control and the stability problem may sometimes occur; hence, pulse-width (pulse-numbers) modulation is even more preferable from such viewpoints as the efficiency of control.

It should also be mentioned that in the exposing apparatus 10, the recording light L need not be completely blocked by the spatial light modulating element 24 in a non-record mode and the recording light L which is insufficient for the light-sensitive material A to be exposed to produce minimal color densities may simply pass through the spatial light modulating element 24 to be incident on the light-sensitive material A. However, no matter how small its amount, the excess of the recording light L had better not be incident on the light-sensitive material A and, hence, the spatial light modulating element 24 is preferably adapted to be such that it is capable of completely blocking the unwanted portion of the recording light L.

As FIG. 2 shows, the drive circuit for the spatial light modulating element 24 basically comprises a correction LUT 40, a D/A converter 42 and a driver 44 of the spatial light modulating element 24.

In the illustrated exposing apparatus 10, image data from a supply source R such as an image reader is supplied to the correction LUT 40 as digital image data for each channel. The correction LUT 40 performs something like "shading correction", in which the channel-to-channel difference of the spatial light modulating element 24 is corrected to ensure uniformity in such parameters as the amount of the recording light L passing through the respective channels.

As already noted, the shaping optics 14 in the exposing apparatus 10 enlarges the recording light L from the source 12 such that it is launched into all channels of the spatial light modulating element 24. Therefore, due to various factors such as the intensity distribution of the light source 12, the aberrations of the shaping optics 14 and positional difference in the passage of the recording light L, the quantity of the recording light L which is launched into the spatial light modulating element 24 is not uniform in all channels. In addition, the light transmittance and the response speed of the spatial light modulating element 24 are not completely uniform in all channels but have certain differences although they are small.

Under the circumstances, even if the recording light L is similarly modulated by the respective channels of the spatial light modulating element 24 so as to expose the light-sensitive material A, the amount of exposure will differ from one channel to another, producing an image having uneven densities.

In order to eliminate these difficulties, the illustrated exposing apparatus 10 has lookup tables (LUT) which adsorb the channel-to-channel differences in the light transmission and response speed for eliminating the density unevenness and other problems. The lookup tables are preliminary set for the respective channels and stored in the correction LUT 40. The image data supplied from an image data supply source R is corrected by the associated LUT to enable the recording of a high-quality image free from the problem of density unevenness.

There is no particular limitation on the method of constructing LUTs and various methods that are employed to construct correction tables in known types of exposing apparatus may be adopted. In one example, the amount by which the recording light L passes through each channel is measured or the light-sensitive material A is actually exposed and density measurements are performed; on the basis of the result of these measurements, correction coefficients, functions and so forth that provide for uniform exposure (recording) in accordance with the supplied image data are calculated for each channel, thereby constructing the desired LUTs.

The image data corrected in the correction LUT 40 is fed into the D/A converter 42, where it is converted from a digital to an analog format, which is sent to the driver 44.

The driver 44 then supplies each channel of the spatial light modulating element 24 with a specified drive voltage for a time duration (pulse width) that is determined by the supplied image data, whereupon the recording light L launched into the spatial light modulating element 24 is modulated in accordance with the image to be recorded.

The light transmittance and response speed of the spatial light modulating element 24 using a liquid crystal are sensitive to temperature. In particular, the ferroelectric smectic A liquid crystals which are employed with advantage in the exposing apparatus of the invention are highly sensitive to temperature as is clear from FIG. 4. In addition, liquid-crystal devices are typically operated at ordinary temperatures but in order to ensure that the ferroelectric liquid crystals retain the smectic A phase (remain as smectic A liquid crystals), the ambient temperature has to be set higher than ordinary temperatures.

To this end, the exposing apparatus 10 of the invention has temperature adjusting means which controls the temperature of the spatial light modulating element 24 to be within a specified range.

In the illustrated exposing apparatus 10, the temperature adjusting means for use on the spatial light modulating element 24 is of a known type which comprises the aforementioned heating module 28 and temperature sensor 30, as well as the base 26 which also serves as a heat accumulator as already mentioned above. The temperature adjusting means is controlled by a control circuit comprising an A/D converter 46, a control unit 48 and a driver 50.

The heating module 28 to be used in the invention is not limited to any particular models and various known types of heating element may be employed as long as they are capable of heating and optional cooling to temperatures within the desired range and which also have satisfactory responses as exemplified by power transistors and thermoelectric coolers (TEC). The same applies to the temperature sensor 30, and various known types may be employed as long as they have satisfactory responses, as exemplified by thermistors and thermocouples.

The temperature of the spatial light modulating element 24 as detected by the temperature sensor 30 is fed into the A/D converter 46, where it is converted to digital data, which is sent to the control unit 48.

The control unit 48 has a temperature control algorithm or LUTs for maintaining the temperature of the spatial light modulating element 24, which is preliminarily set by any known method and which represents the relationship between the temperature as detected by the sensor 30 (or its difference from the temperature setting) and the energy to be supplied to the heating module 28. The control unit 48 is supplied with the temperature setting (PF) which is an optimal value for the spatial light modulating element 24 (PF may be preliminarily stored in the control unit 48) and, taking the difference between the measured data of temperature and PF, the control unit 48 determines the energy to be supplied to the heating module 28 utilizing the temperature control algorithm or LUTs and sends a command signal to the driver 50, which supplies the heating module 28 with an amount of energy that complies with the command signal from the control unit 48, whereby the temperature of the spatial light modulating element 24 is maintained at a constant level.

There is no particular limitation on the range over which temperature adjustment is made in the exposing apparatus 10 and it may be set as appropriate for the temperature dependency of the respective characteristics of the spatial light modulating element 24 to be used. A preferred range is approximately the reference temperature ±1° C., with the range of the reference temperature ±0.1° C. being even more preferable.

As already mentioned, the illustrated exposing apparatus 10 has the optical modulator 16 and other components of the optical unit 20 contained in a housing as an integral assembly. Therefore, in order to ensure more effective temperature adjustment of the spatial light modulating element 24, it is preferred that the optical unit 20 is also subjected to temperature adjustment such that its interior is held at a specified temperature.

The reference temperature setting may be determined as appropriate for the specific liquid crystal used in the spatial light modulating element 24 such that stable operation is ensured.

As already noted, ferroelectric liquid crystals are generally known to experience a phase transition from smectic C* to smectic A as the temperature rises and in order to maintain the smectic A phase, the ferroelectric liquid crystals have to be retained higher than ordinary temperatures. However, considering the possible effects on other optical elements, it is not preferred that the reference temperature is set to be very high. On the other hand, if the reference temperature is set too close to the phase transition point, the state of the liquid crystal may potentially change upon small temperature variations.

Therefore, if the spatial light modulating element 24 uses a ferroelectric smectic A liquid crystal, the reference temperature is preferably set at the lowest possible level that allows the liquid crystal to maintain the smectic A phase stably; more preferably, the reference temperature is set about 5° C. higher than the point of transition from the smectic C* to the smectic A phase.

As already noted, the recording light L modulated by the optical modulator 16 (or spatial light modulating element 24) in accordance with the image to be recorded is incident on the imaging optics 18, from which it emerges as 64 beams ($L_1$–$L_{64}$) of a specified size and resolution (density) which, in turn, are imaged on the light-sensitive material A held on the exposing drum 22.

The exposing drum 22 rotates about its own longitudinal axis at a specified speed in the direction of arrow a and, at the same time, the optical unit 20 moves in the direction of arrow b parallel to the longitudinal axis of the exposing drum 22 at a specified speed, for example, such a speed that when the exposing drum 22 has made a full rotation, the beam of recording light L for the first channel becomes adjacent, at a resolution-dependent spacing, to and downstream, in the direction of arrow b, from the scanning line formed by the beam for the 64th channel. As a result, the light-sensitive material A is subjected to two-dimensional blanket exposure to the recording light L.

The exposing apparatus 10 performs exposure using 64 beams of recording light L and, as already mentioned, even high-quality (hence, high-resolution) images can be recorded at a very fast speed.

The exposing apparatus 10 has the added advantage that by adjusting or selecting the power and other refraction characteristics of the imaging optics 18, the shape and size of the spot of recording light L to be imaged on the light-sensitive material A, as well as the distance between adjacent channels and other factors can be effectively adjusted to improve the resolution and other optical parameters.

The exposing 10 apparatus described on the foregoing pages is such that the temperature of the spatial light modulating element 24 is detected with the temperature sensor 30 and, on the basis of the result of the detection, the heating module 28 is driven to maintain the spatial light modulating element 24 at a specified temperature. However, this is not the sole case of the invention and the quantity of the recording light L that has passed through the optical modulator 16 (or the spatial light modulating element 24) may be measured and, on the basis of the result of the measurement, the heating module 28 is driven to maintain the spatial light modulating element 24 at a specified temperature.

Figure 5:
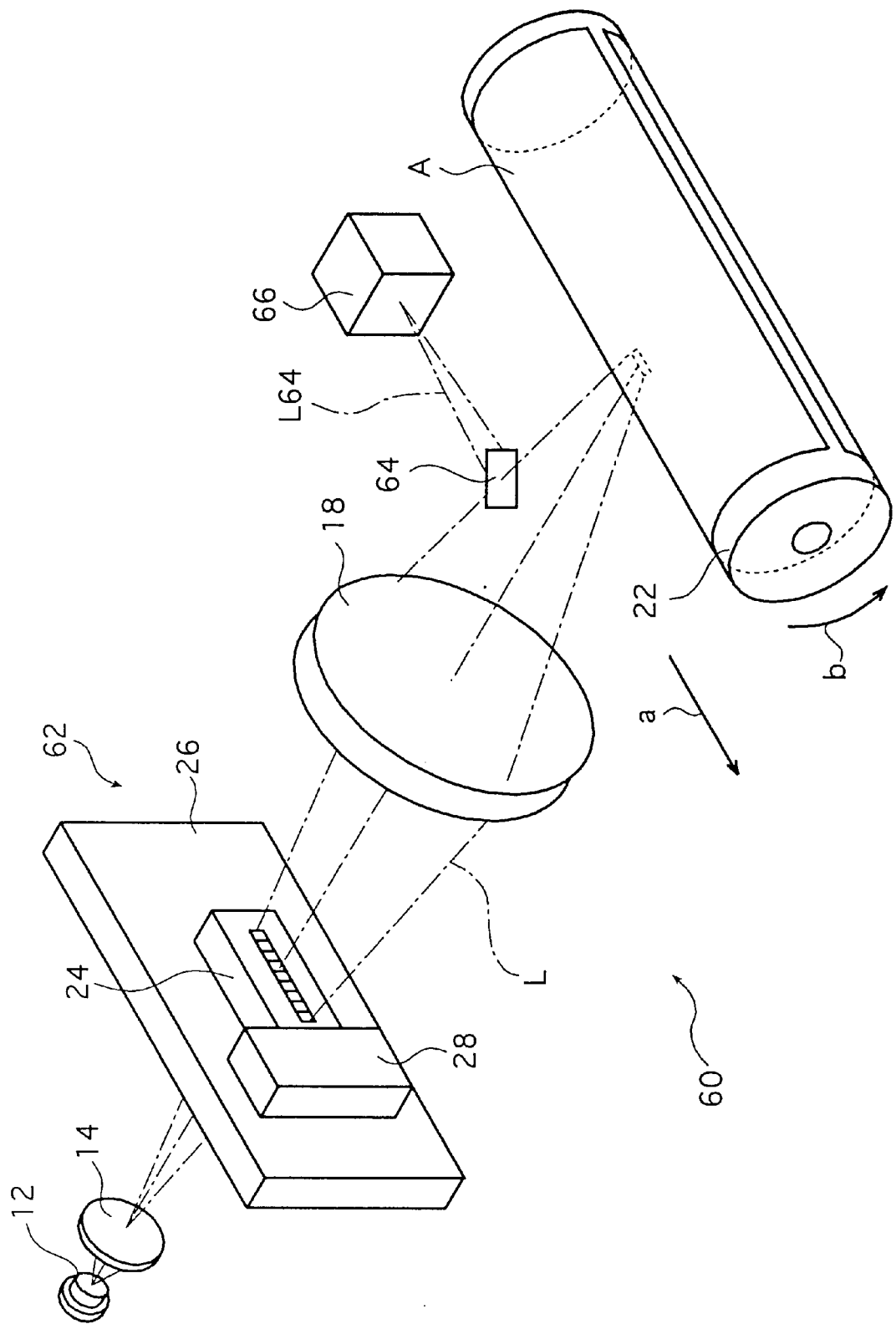
FIG. 5 is a perspective view showing schematically another embodiment of the exposing apparatus of the invention.
Figure 6:
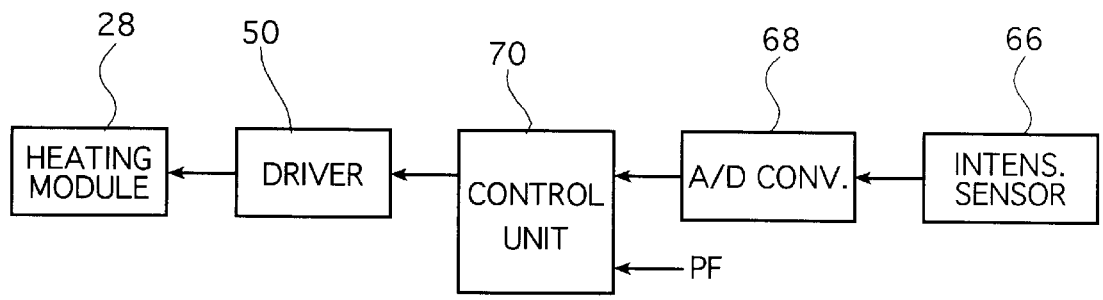
FIG. 6 is a block diagram of the temperature control circuit for the exposing apparatus shown in FIG. 5.

An exposing apparatus constructed according to this design is shown schematically in perspective in FIG. 5. A block diagram of the temperature control circuit for the exposing apparatus is shown in FIG. 6. Except for the method of temperature control, the exposing apparatus indicated by 60 in FIG. 5 has essentially the same configuration as the exposing apparatus 10 and like parts are identified by like numerals; hence, the following description is generally directed to dissimilar parts.

The exposing apparatus 60 shown in FIG. 5 does not have a temperature sensor in an optical modulator 62 but an optical path splitting mirror 64 which reflects at least a portion of the recording light L; say, beam $L_{64}$ for the 64th channel is positioned downstream of the imaging optics 18 in the direction of travel of the recording light L and the beam $L_{64}$ is launched into an intensity sensor 66 so that its amount is measured.

The intensity sensor 66 to be used in the embodiment under consideration is not limited to any particular type and any known intensity sensors may be employed, as exemplified by photodiodes, photomultipliers and CCD sensors.

As FIG. 6 shows, the amount of recording beam $L_{64}$ detected by the intensity sensor 66 is fed into an A/D converter 68, where it is converted to digital data, which is sent to a control unit 70.

As already mentioned, the light reflectance of the spatial light modulating element 24 varies with its temperature. Hence, if the quantity of the recording light L is detected, the state (temperature) of the spatial light modulating element 24 can be detected on the basis of the quantity of the recording light L. By controlling the drive of the heating module 28 accordingly, the state, or the temperature, of the spatial light modulating element 24 can be maintained within a specified range.

The control unit 70 has a temperature control algorithm or LUTs for maintaining the temperature of the spatial light modulating element 24, which are preliminarily set by any known method and which represent the relationship between the quantity of recording light L detected by the intensity sensor 66 and the energy to be supplied to the heating module 28. The control unit 70 is supplied with the temperature setting (PF) which is an optimal value for the spatial light modulating element 24 (PF may be preliminarily stored in the control unit 70) and, based on the measured data of light intensity and PF, the control unit 70 determines the energy to be supplied into the heating module 28 utilizing the temperature control algorithm or LUTs and sends a command signal to the driver 50, which supplies the heating module 28 with an amount of energy that complies with the command signal from the control unit 70, whereby the temperature of the spatial light modulating element 24 is maintained at a constant level.

In the case just described above, a signal beam of recording light L is detected and the drive of the heating module 28 is controlled in accordance with the amount (intensity )of that beam. This is not the sole case of the invention and the exposing apparatus 60 may be so adapted that more than one beam of the recording light L, say, two beams, one for the first channel and the other for the 64th channel, are detected and the drive of the heating module 28 is controlled on the basis of the detected beams.

If the system shown in FIG. 5 is of such a type that 64-channel image exposing is to be performed, the number of channels in the spatial light modulating element 24 may be increased to 65 so that one beam of the recording light L is set aside for detection purposes.

Figure 7:
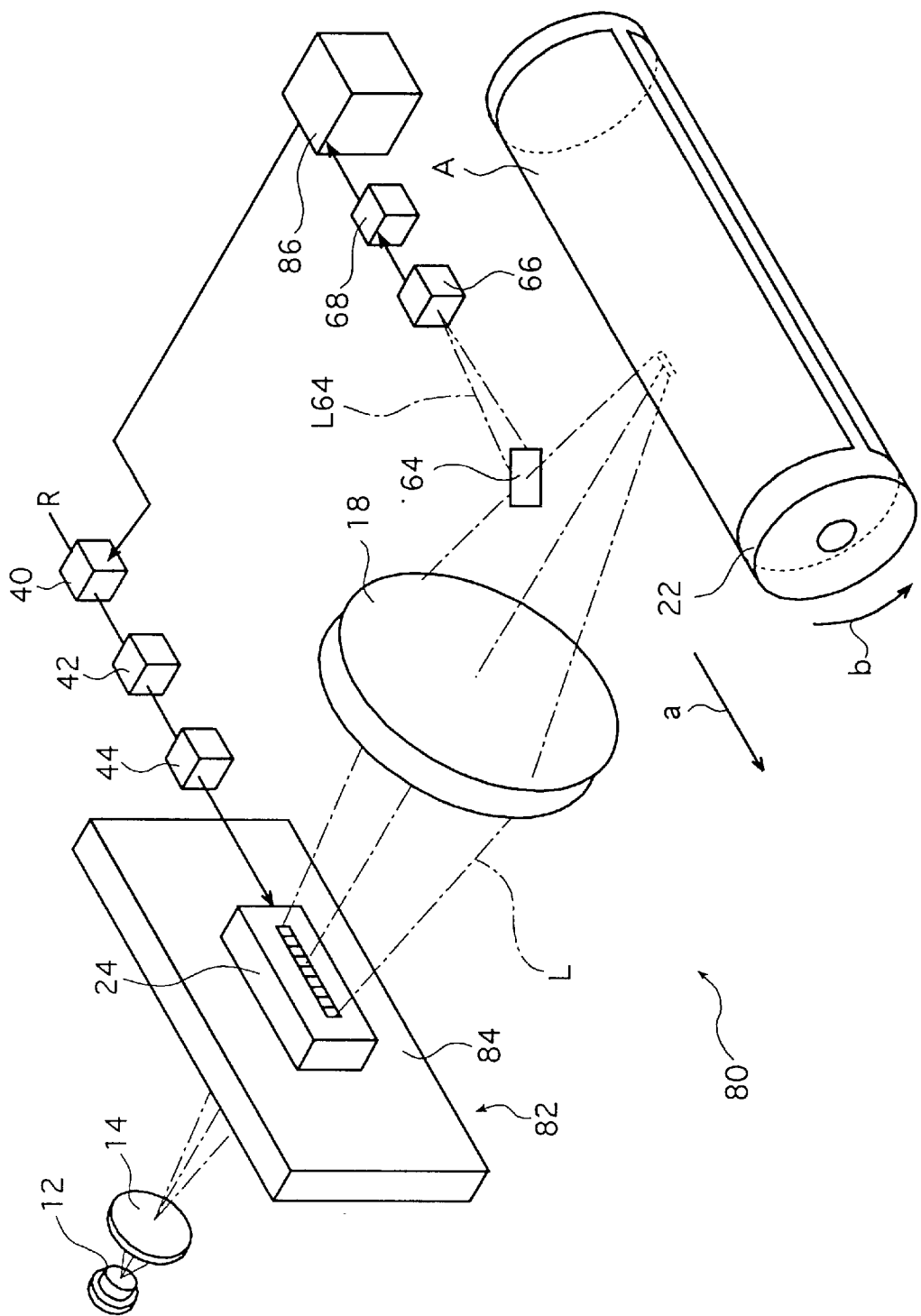
FIG. 7 is a perspective view showing schematically yet another example of the exposing apparatus of the invention.

FIG. 7 is a schematic perspective view showing yet another example of the exposing apparatus of the invention.

The exposing apparatus 10 and 60 described above share the common feature of maintaining the spatial light modulating element 24 at a specified temperature so that it operates stably enough to realize rapid recording of high-resolution images. In the exposing apparatus generally indicated by 80 in FIG. 7, the quantity of recording light L is measured as in the case of the exposing apparatus 60 and, on the basis of the result of the measurement, the image data is corrected such that images of high resolution can be recorded consistently at high speed.

Except that the image data is processed without adjusting the temperature of the spatial light modulating element 24, the exposing apparatus 80 shown in FIG. 7 has basically the same configuration as the exposing apparatus 60 and like parts are identified by like numerals; hence, the following description is generally directed to dissimilar parts.

In the exposing apparatus 80, an optical modulator 82 comprises a base 84 and the spatial light modulating element 24. The base 84 may be of a common type which holds and fixes the optical modulator 82 in a predetermined position.

Although not shown specifically, if the spatial light modulating element 24 in the exposing apparatus 80 uses a ferroelectric smectic A liquid crystal, the spatial light modulating element 24 and/or the optical unit must have their temperature adjusted in order to ensure that the liquid crystal maintains the smectic A phase. Further in addition, temperature control means for maintaining the spatial light modulating element 24 at a constant temperature as in the case of the exposing apparatus 10 and 60 is preferably employed in order to stabilize the operation of the spatial light modulating element 24.

As in the case of the exposing apparatus 60, the optical path splitting mirror 64 which reflects at least a portion of the recording light L, say, the beam $L_{64}$ for the 64th channel is provided downstream of the imaging optics 18 in the exposing apparatus 80 and the beam $L_{64}$ is launched into the intensity sensor 66 so that its amount is measured.

The amount of the beam $L_{64}$ as detected by the intensity sensor 66 is fed into the A/D converter 68, where it is converted to digital data, which is sent to a control unit 86.

As already mentioned, the light transmittance of the spatial light modulating element 24 which uses a liquid crystal is variable with its own temperature.

The control unit 86 modifies the LUTs in the correction LUT 40 in accordance with the measured data of light intensity such that the exposure to the recording light L will comply with the image data from the image data supply source R.

Specifically, in order to ensure that the recording light L (beams $L_1$–$L_{63}$) modulated by the spatial light modulating element 24 in accordance with the image data processed by the LUTs in the correction LUT 40 will comply with the image data from the image data supply source R, the control unit 86 has an algorithm or LUTs set and stored preliminarily for setting the conditions for modifying the LUTs in the correction LUT 40 on the basis of both the prescribed quantity of beam $L_{64}$ which should be measured when the spatial light modulating element 24 is in a specified state and the quantity of the beam $L_{64}$ actually measured with the intensity sensor 66.

Upon receiving the data on the beam $L_{64}$ as measured with the intensity sensor 66, the control unit 86 refers to said algorithm or LUTs and sets the conditions for modifying the individual LUTs in the correction LUT 40 as well as modify those LUTs.

The image data supplied from the image data supply source R into the correction LUT 40 is processed with the thus modified LUTs and transferred through the D/A converter 42 into the driver 44, which drives the spatial light modulating element 24 in accordance with the processed image data.

Thus, according to the exposing apparatus 80 of the invention, the variations in the state of the spatial light modulating element 24 (hence, the resulting changes in the quantity of light transmission and the operating speed) are sufficiently absorbed to ensure that high-quality (high-resolution) images are recorded stably at high speed in accordance with the image data from the image data supply source R.

In the foregoing description, the LUTs in the correction LUT 40 are modified in accordance with the measured data on the intensity (amount) of the recording light L. However, this is not the sole case of the invention and the control unit 86 may be adapted to be such that a separate group of correction LUTs are specifically constructed on the basis of the above-defined prescribed quantity of the recording light L and the actually measured quantity, set in the correction LUT 40 and used to process of the image data, followed by further processing of the image data with the LUTs already stored in the correction LUT 40. The order of processing the image data with the additional correction LUTs and the LUTS stored in the correction LUT 40 may be reversed.

Alternatively, the conditions for correction may be set in the image data supply source R rather than in the correction LUT 40 such that the image data to be delivered from the source R is processed and thereafter supplied from the source R into the exposing apparatus 80.

While the exposing apparatus of the invention has been described above in detail, it should be understood that the invention is by no means limited to the specific examples given on the foregoing pages and that various improvements and modifications may of course be made without departing from the spirit and scope of the invention. For example, instead of employing a single optical unit as in the foregoing examples, a plurality of optical units may be provided in direction of the rotation or parallel to the rotating axis of the exposing drum such that simultaneous exposure is accomplished with these optical units for color exposing or improving the exposing speed.

As described above in detail, the exposing apparatus of the invention uses a multi-channel spatial light modulating element utilizing a liquid crystal, most preferably a ferroelectric smectic A liquid crystal and this ensures that images of high quality (high resolution) can be recorded at high speed by performing multi-channel exposure with an inexpensive and simple device design.

What is claimed is:

1. An apparatus for exposing a light-sensitive material to recording light modulated in accordance with an image to be recorded, which comprises:
   a source of the recording light;
   a multi-channel spatial light modulating element using a ferroelectric liquid crystal as modulating means;
   imaging optics with which the recording light modulated with said spatial light modulating element is imaged on said light-sensitive material; and
   adjusting means for adjusting temperature of said spatial light modulating element, including heating means disposed adjacent to said spatial light modulating element for heating and retaining said ferroelectric liquid crystal at a preset reference temperature so that said ferroelectric liquid crystal used in said spatial light modulating element is allowed to maintain a smectic A phase stably.

2. The exposing apparatus according to claim 1, wherein said adjusting means adjusts the temperature of said spatial light modulating element within a preset temperature range centered by said preset reference temperature.

3. The exposing apparatus according to claim 1, wherein said temperature adjusting means adjusts the temperature of said spatial light modulating element on the basis of at least one of detection of the temperature of said spatial light modulating element and the amount of light modulated by said spatial light modulating element.

4. The exposing apparatus according to claim 3, further comprising a base for holding and fixing said spatial light modulating element and temperature adjusting means, said base also serving as means for retaining heat to adjust the temperature of said spatial light modulating element.

5. The exposing apparatus according to claim 1, wherein said multi-channel spatial light modulating element contains between 16 and 256 channels.

6. The exposing apparatus according to claim 2, wherein said preset temperature range adjusted by said adjusting means is a range of the preset reference temperature ±0.1° C.

7. The exposing apparatus according to claim 6, wherein said present temperature range adjusted by said adjusting means is a range of the preset reference temperature ±0.1° C.

8. The exposing apparatus according to claim 1, wherein said preset reference temperature is 5° C. higher than a point of transition from a smectic C* phase to said smectic A phase in said ferroelectric liquid crystal.

9. The exposing apparatus according to claim 2, wherein said adjusting means further comprises:
   a temperature sensor disposed adjacent to said spatial light modulating element for detecting the temperature of said spatial light modulating element; and
   a control unit for controlling said heating means in accordance with the temperature detected by said temperature sensor in such a way that the temperature of said spatial light modulating element is retained within said preset temperature range.

10. The exposing apparatus according to claim 9, wherein said control unit controls the temperature of said spatial light modulating element based upon at least one of a temperature control algorithm and a look-up-table which represent a relationship between the temperature detected by said temperature sensor and energy to be supplied to said heating means.

11. The exposing apparatus according to claim 2, wherein said adjusting means further comprises:
   an intensity sensor for measuring an amount of the recording light modulated with said spatial light modulating element; and
   a control unit for controlling said heating means in accordance with the amount of the recording light measured by said intensity sensor in such a way that the temperature of said spatial light modulating element is retained within said preset temperature range.

12. The exposing apparatus according to claim 11, wherein said control unit controls the temperature of said spatial light modulating element based upon at least one of a temperature control algorithm and a look-up table which represent a relationship between the amount of the recording light measured by said intensity sensor and energy to be supplied to said heating means.

13. The exposing apparatus according to claim 1, wherein each channel of said multi-channel spatial light modulating element subjects said recording light to at least one of pulse-width modulation and pulse-numbers modulation.

14. An apparatus for exposing a light-sensitive material to recording light modulated in accordance with image data supplied from a source of image data, which comprises:
   a source of the recording light;

a multi-channel spatial light modulating element using a ferroelectric liquid crystal as modulating means;

imaging optics with which the recording light modulated with said spatial light modulating element is imaged on said light-sensitive material;

adjusting means for adjusting temperature of said spatial light modulating element, including heating means disposed adjacent to said spatial light modulating element for heating and retaining said ferroelectric liquid crystal at a preset reference temperature higher so that said ferroelectric liquid crystal used in said spatial light modulating element is allowed to maintain a smectic A phase stably;

a sensor for measuring an amount of light modulated with said spatial light modulating element; and correcting means for correcting said image data in accordance with the amount of light detected by said sensor.

15. The exposing apparatus according to claim 14, wherein said adjusting means adjusts the temperature of said spatial light modulating element within a preset temperature range centered by said preset reference temperature.

16. An apparatus for exposing a light-sensitive material to recording light modulated in accordance with an image to be recorded, which comprises:

a source of the recording light;

a multi-channel spatial light modulating element using a liquid crystal as modulating means;

imaging optics with which the recording light modulated with said spatial light modulating element is imaged on said light-sensitive material;

a temperature sensor connected to said spatial light modulating element, for detecting a temperature of said spatial light modulating element;

a heating module connected to said spatial light modulating element for providing energy to said spatial light modulating element; and a control unit for controlling a temperature of said spatial light modulating element based upon a relationship between temperature as detected by said temperature sensor, and said energy to be supplied to the heating module based upon at least one of a temperature control algorithm and a look-up-table, in order to retain said ferroelectric liquid crystal at a preset reference temperature so that said ferroelectric liquid crystal used in said spatial light modulating element is allowed to maintain a smectic A phase stably.

17. The exposing apparatus according to claim 16, wherein said control unit controls the temperature of said spatial light modulating element within a preset temperature range centered by said preset reference temperature.

* * * * *